United States Patent [19]

McMahan et al.

[11] Patent Number: 5,063,480

[45] Date of Patent: Nov. 5, 1991

[54] VEHICLE HEADLAMP ADJUSTMENT DEVICE

[75] Inventors: David R. McMahan; William E. Magengast; Luis A. Mateos, all of Anderson, Ind.

[73] Assignee: General Motors Corporation, Detroit, Mich.

[21] Appl. No.: 566,905

[22] Filed: Aug. 13, 1990

[51] Int. Cl.⁵ .............................................. B60Q 1/02
[52] U.S. Cl. ...................................... 362/61; 362/66; 362/419; 362/421
[58] Field of Search ....................... 362/61, 66, 80, 82, 362/83, 418, 419, 420, 421

[56] References Cited

U.S. PATENT DOCUMENTS 4,922,387  5/1990  Ryder et al. ......................... 362/80

Primary Examiner—Ira S. Lazarus
Assistant Examiner—Sue Hagarman
Attorney, Agent, or Firm—Edward J. Biskup

[57] ABSTRACT

An adjustment device for a headlamp assembly that provides aiming adjustment of the headlamp unit in a horizontal plane, after which the adjustment device can be set to visually indicate that the headlamp unit is at a zero ("O") reference marking and also permit re-calibration of the lamp unit if the latter is re-aimed.

3 Claims, 2 Drawing Sheets

VEHICLE HEADLAMP ADJUSTMENT DEVICE

This invention concerns headlamps in general and, more particularly, concerns an integral adjustable aiming arrangement for a headlamp unit.

In accordance with current government regulations, headlamps may now be designed to permit so called on-board-vehicle-aiming. In this regard, U.S. Pat. No. 4,794,495, entitled "Headlamp Assembly", and assigned to the assignee of this invention shows a headlamp assembly that permits mounting within a small area and that can be readily adjusted in position in a vertical plane without requiring special equipment to do so. In order to realize the adjustment of the headlamp in the vertical plane, a level device is attached to the headlamp unit and provides a visual indication from above and from the front of the headlamp assembly when the headlamp unit is properly aimed in the vertical plane. Although the headlamp assembly shown in the above-mentioned patent does provide for aiming in the vertical plane it does not provide aiming in the horizontal plane and allow re-calibration of the adjustment device after proper aiming of the headlamp. Accordingly, the present invention concerns an adjustment device for a headlamp assembly that achieves this end.

SUMMARY OF THE INVENTION

The adjustment device according to the present invention is intended to be incorporated in a headlamp assembly which is structurally similar to the headlamp assembly shown in the above mentioned patent. More specifically, the headlamp assembly is adapted to be mounted to a support panel at the front end of a vehicle and includes a rectangular lamp unit formed with a radially outwardly extending flange which surrounds the lamp unit adjacent the lens thereof. The flange is provided with an outer vertical surface which has three aiming pads formed thereon that define an aiming plane. A pair of laterally spaced pivot supports are adapted to be secured to the front end of the support panel and cooperate with a rectangular retainer member which carries the lamp unit. The retainer member has a configuration which conforms to the flange of the lamp unit and comprises a pair of vertically spaced horizontal sections and a pair of horizontally spaced vertical sections, all of which are interconnected to form a rectangular ring-like member. Each of the sections is L-shaped in cross-section having a first wall located in a common substantially vertical plane and a second wall which lies in a plane which is substantially perpendicular to the first wall. The horizontal sections have integral tabs for maintaining the lamp unit within the retainer member with the aiming pads contacting the first wall of at least two of the sections. Also, the vertical sections of the retainer member each has an intermediate portion which cooperates with the pair of pivot supports for allowing the lamp unit to be pivotable in a vertical plane about a horizontal aim axis. A spring is provided between the support panel and one of the horizontal sections of the retainer member and cooperates with an adjustment device connected between the other of the horizontal sections and the retainer member for maintaining the lamp unit in an adjusted position and permitting adjustment of the position of the lamp unit in the vertical plane. As explained above, a level device is attached to the upper horizontal section of the retaining ring and serves as an on-board-vehicle-aiming device for providing the visual indication that the lamp unit is properly aimed in a vertical plane. In addition and according to the invention, one of the above mentioned pivot members actually serves as an adjustment device constructed in a manner so as to provide re-calibration after aiming of the lamp unit to thereby provide a visual indication that the lamp unit had been properly aimed in a horizontal plane. In this regard and in the preferred form, the adjustment device according to the invention comprises a housing fixed to the support panel and supporting a relatively movable pivot member one end of which is provided with a curved pivot surface about which the associated intermediate portion of one of the vertical sections can pivot. A screw is rotatably supported by the housing and is threadably connected to the pivot member for moving the latter relative to the housing for adjusting the associated portion of the headlamp unit fore and aft of the support panel for aiming purposes. Also, indicia is formed on the housing for indicating the aim position of the lamp unit in the horizontal plane. A pointer indicator is adjustably carried by the pivot member adjacent to the indicia so that upon achieving the desired aim of the headlamp unit by movement of the pivot member, the pointer indicator is subsequently moved relative to the indicia to a zero ("0") marking so as to indicate the adjusted aim position and to allow re-calibration of the lamp unit in the event the lamp unit must again be aimed in the horizontal plane.

The objects of the present invention are to provide a new and improved adjustment device for a headlamp assembly that, after adjustment of the headlamp unit in a horizontal plane, the adjustment device can be manually set using a hand tool to visually indicate that the headlamp unit is at a zero ("0") reference marking; to provide a new and improved headlamp assembly having a retainer ring for supporting a lamp unit and which includes a level device that allows the lamp unit to be readily adjusted in a vertical plane about a horizontal aim axis and includes a screw-operated adjustment device that allows the lamp unit to be properly adjusted in a horizontal plane after final assembly of the vehicle and afterwards can be re-calibrated if the need should arise; to provide a new and improved headlamp assembly which includes a retainer member connected to the flange of a headlamp unit for supporting the latter and includes a level device for allowing aiming of the lamp unit in a vertical plane and also includes an adjustment device located at one end of the headlamp unit for providing fore and aft adjustable movement of said one end and that includes indicia and a pointer indicator which can be repositioned relative to the indicia to indicate the correct aim position of the headlamp unit in a horizontal plane and also allows the adjustment device to be re-calibrated; and to provide a new and improved headlamp assembly having a pair of pivot supports one of which serves as a first screw-operated adjustment device and that, together with a second screw-operated adjustment device, cooperates with a ring-like retainer member for mounting a headlamp unit to a support panel at the front end of a motor vehicle and in which the second screw-operated adjustment device is characterized by having of indicia formed thereon adjacent a position indicator which is movable relative to the indicia by use of a hand tool to thereby provide a visual indication that the headlamp had been placed in a properly aimed position in a horizontal plane.

BRIEF DESCRIPTION OF THE DRAWING

Other objects and advantages of the present invention will be more apparent from the following detailed description when taken with the drawings in which.

DESCRIPTION OF THE PREFERRED EMBODIMENT

Figure 1:
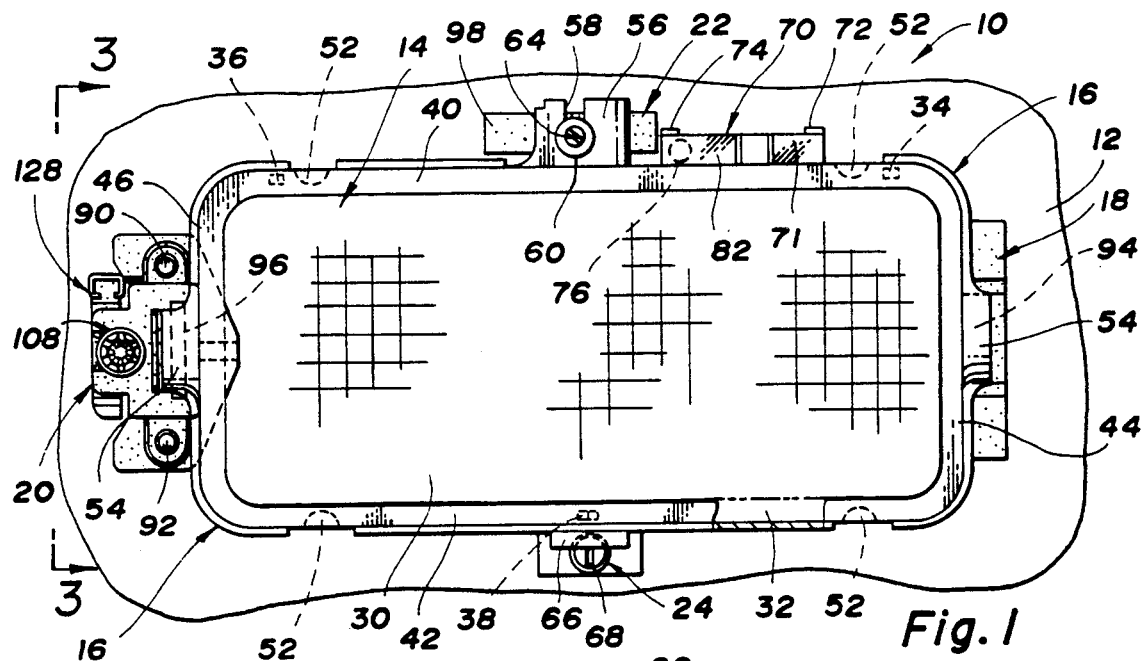
FIG. 1 is a front elevational view of a headlamp assembly incorporating an adjustment device according to the present invention that serves to adjustably connect a headlamp unit to a support panel at the front end of a motor vehicle.
Figure 2:
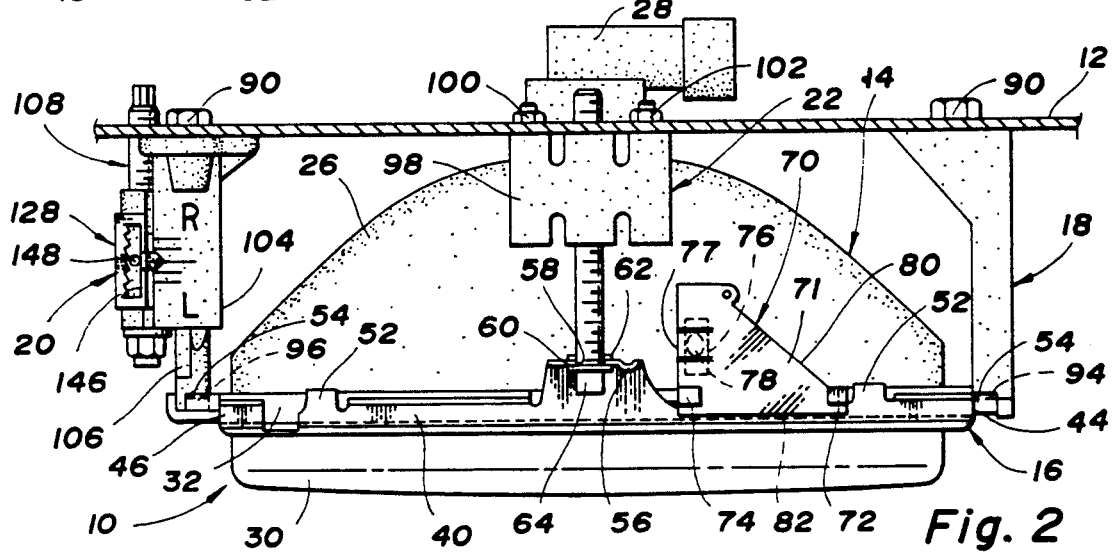
FIG. 2 is a top plan view of the headlamp assembly shown in FIG. 1.
Figure 3:
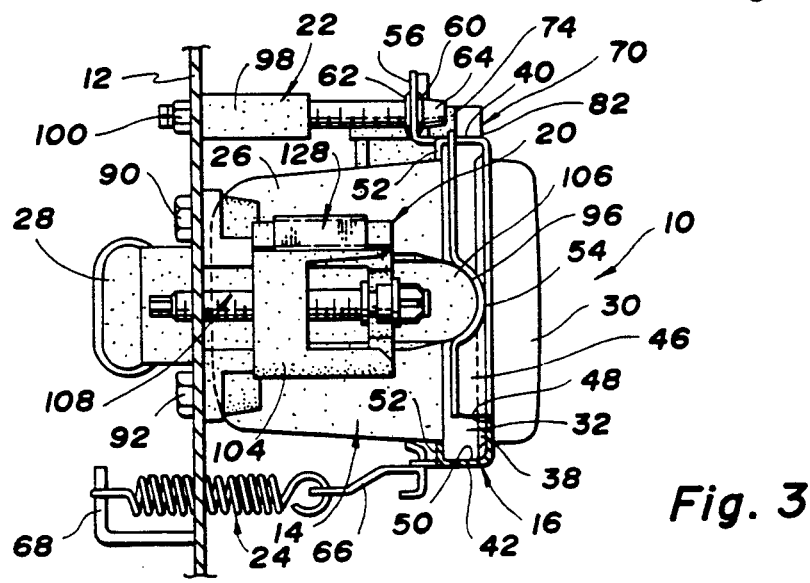
FIG. 3 is a side elevational view taken on line 3—3 of FIG. 1.

Referring now to the drawings and, more particularly, to FIGS. 1 through 3 thereof, a headlamp assembly 10 is shown mounted to a support panel 12 which forms a part of the front end of a motor vehicle (not shown). The headlamp assembly 10 includes a lamp unit 14 supported by a retainer member 16 which, in turn, is connected to the support panel 12 by a bracket 18 that serves as a pivot support, a pair of screw-operated adjustment devices 20 and 22, (the former of which is made according to the present invention and also serves as a pivot support), and a tension spring 24.

More specifically, the lamp unit 14 incorporated in the headlamp assembly 10 is a so-called mini lamp which, in this case, takes the form of an all glass, rectangular, sealed beam lamp unit having a body portion 26 provided with a parabolic cavity, the inner concave surface (not shown) of which is aluminized so as to serve as a reflector. A plug-type, high-efficiency light bulb 28 has its bulb portion located within the cavity and its plug portion sealed to the body portion 26 of the lamp unit 14 with the filament of the bulb portion suitably positioned to provide the desired beam which can be either a high beam or a low beam. The front of the body portion 26 is formed with a rim which is fused to a complementary rim of a lens 30 so as to provide a radially outwardly extending flange 32 which completely surrounds the lamp unit 14. The flange 32 has a vertical face provided with three aiming pads 34, 36 and 38, the terminal ends of which define an aiming plane which is perpendicular to the optical axis of the lamp unit 14.

The retainer member 16 is a metal stamping having a configuration conforming to the rectangular configuration of the flange 32 on the lamp unit 14 and comprises a pair of vertically spaced top and bottom sections 40 and 42 respectively which are horizontally orientated as seen in FIG. 1. The top and bottom sections 40 and 42 are connected at their opposed ends to a pair of horizontally spaced and vertically orientated side sections 44 and 46. As seen in FIG. 3, each of the sections 40-46 is L-shaped in cross-section and consists of a first wall having a flat rear surface 48 located in a common substantially vertical plane and a second wall having a flat surface 50 which lies in a plane perpendicular to the first wall. The lamp unit 14 is supported by the retainer member 16 and, in this regard, note that its flange 32 is located within the sections 40-46 of the retainer member 16 and integral tabs 52 formed with the top and bottom sections 40 and 42 are bent over the flange 32 so as to cause the aiming pads 34, 36 and 38 to contact the surface 48 of the first wall of each section 40 and 42. As aforementioned, the surface 48 of the sections 40-46 is in a common plane, and therefore with the terminal ends of the aiming pads 34, 36 and 38 contacting the surface 48, the retainer member 16 becomes an aiming ring. Also, each of the side sections 44 and 46 is formed with a curved portion 54 located mid-way between the ends of the associated side section. The curved portion 54 of the sections 44 and 46 cooperates with the bracket 18 and the adjustment device 20 for supporting the retainer member 16 for pivotal movement and, in turn, the lamp unit 14 for adjustable pivotal movement in a vertical plane about a horizontal aim axis. Also, the top section 40 is formed with an upstanding and integrally formed flange 56 having a U-slot 58 which receives the annular slot between annular collars 60 and 62 formed to the rear of the head 64 of the adjustment screw of adjustment device 22 for purposes to be explained hereinafter. In addition, the bottom section 42 has an integral tang 66 to which is attached the front end of the coil spring 24, the rear end of which is secured to a leg 68 rigidly formed with the support panel 12.

A level device 70 having a clear plastic body 71 is also incorporated with the retainer member 16 and held in place by a pair of tabs 72 and 74 integral with the top section 40. The level device 70 has a cylindrical chamber 76 formed along one edge 77 thereof, and the level device 70 when assembled to the retainer member 16 is adjusted to have the longitudinal center axis of the chamber 76 perpendicular to the plane of the surface 48 of the sections 40-46 of the retainer member 16. As seen in FIG. 2 and as is conventional, the chamber 76 is filled with a viscous fluid entrapping a gas bubble 78 which moves within the confines of the chamber 76 as the level device 70 moves with the attached retainer member 16. As is conventional with leveling devices, the chamber 76 has a slight internal arc providing a high point midway in the chamber 76 as indicated by the line markings. Thus, when the gas bubble 78 is between the line markings, the retainer member 16 and, accordingly, the lamp unit 14 is in proper aim in a vertical plane. As seen in FIG. 2, the bubble 78 is located between the two line markings and therefore in proper aim. One feature of the level device 70 is that it has a polished flat surface along edge 80 which is at an angle of 45 degrees relative to the edge 77. The polished surface is positioned so that, when the level device 70 is viewed from its front end, the chamber 76 is reflected to the front surface 82 and, by appropriately located line markings on the front surface 82, one can determine whether the lamp unit 14 is properly aimed. Accordingly, the level device 70 not only permits proper aim of the lamp unit 14 about the two pivot supports in a vertical plane to be observed from above the headlamp assembly 10 but also from the front thereof when the screw 22 is manually rotated by a tool such as a screw driver. Additional views of the structure of the level device 70 incorporated in this headlamp assembly 10 can be seen in the U.S. patent referred to above.

Both the bracket 18 and the adjustment device 20 are secured to the support panel 12 at their rear end by a pair of screws 90 and 92. The front end of the bracket 18 and the front end of the adjustment device 20 are provided with identically shaped and sized pivot surfaces 94 and 96, respectively, about which the headlamp unit 14 pivots. Each pivot surface 94 and 96 is convex in configuration and complementary to and received by the associated curved portion 54 formed with the retainer member 16. It should be apparent that the spring 24 applies the retaining force to the adjusting screw of adjustment device 22 which is threadably received by a nut member 98 secured by threaded fasteners 100 and 102 to the support panel 12. The spring 24 also causes each of the curve portions 54 of the retainer member 16 to apply a force to the pivot surfaces 94 and 96 and, in this manner, holds the lamp unit 14 in the properly adjusted position. Other than the adjustment screw 22, the spring 24, in effect, serves to hold the combined headlamp unit 14 and retainer member 16 to the support panel 12.

Figure 4:
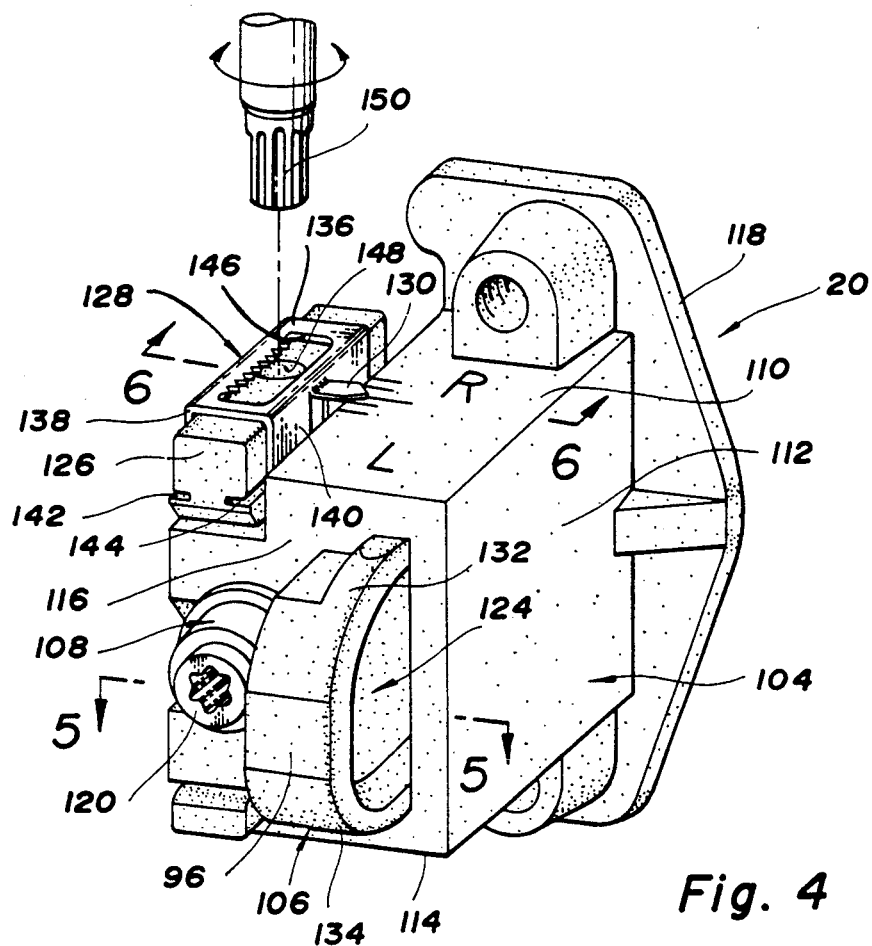
FIG. 4 is a perspective view of the adjustment device according to the present invention.
Figures 5, 6:
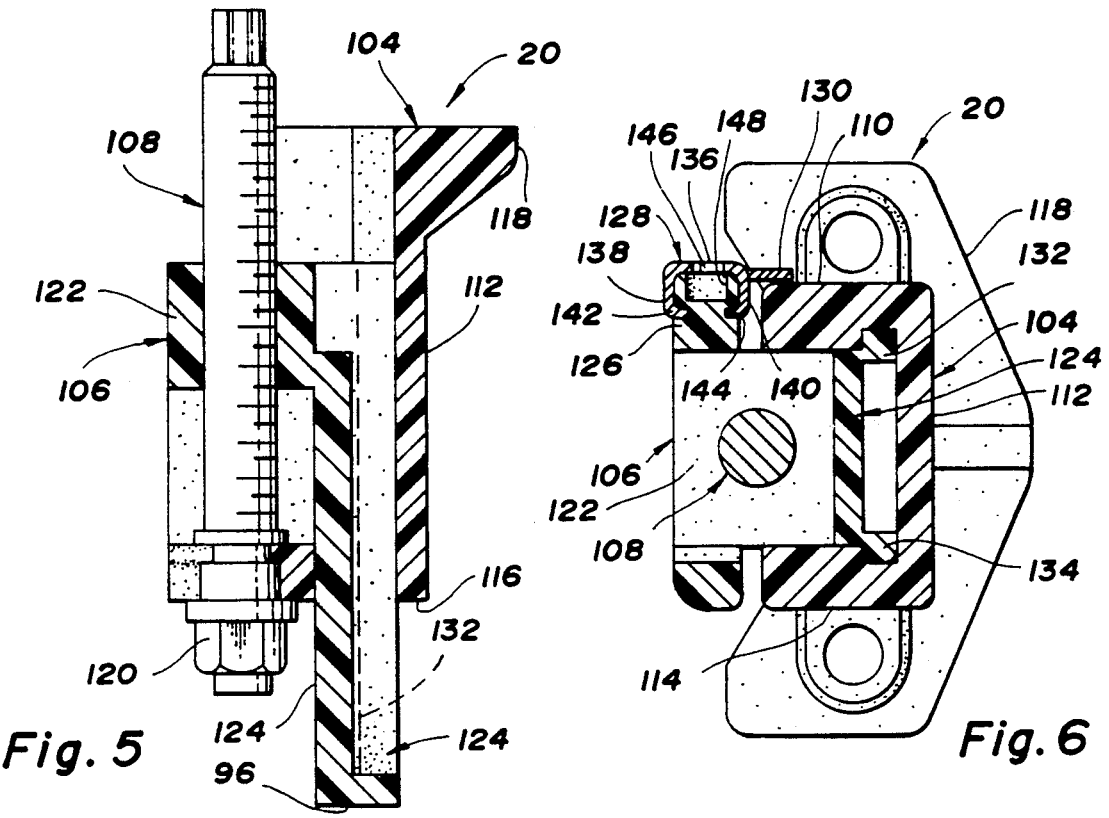
FIG. 5 is an enlarged sectional view of the adjustment device taken on line 5—5 of FIG. 4.
FIG. 6 is an enlarged sectional view of the adjustment device taken on line 6—6 of FIG. 4.

Generally speaking and as best seen in FIGS. 4-6, the adjustment device 20 is a two-piece unit consisting of a base housing 104 and an axially movable pivot member 106 slidably received within the base housing. An adjuster screw 108 is rotatably carried by the base housing 104 and is threadably received by the pivot member 106 so that, upon rotation of the adjuster screw 108 in one direction or the other, the pivot member 106 will move axially or fore or aft of the support panel 12 with resultant movement of the lamp unit 14 in a horizontal plane.

The base housing 104 of the adjustment device 20 is made of a plastic material and includes a top wall 110, side wall 112, bottom wall 114 and a front wall 116 all of which are integrally formed with a generally planar mounting section 118 which is secured to the support panel by the screws 90 and 92. As best seen in FIG. 5, the head 120 of the screw 108 is carried by the front wall 116 of the housing for rotational movement but is restrained from axial movement. The threaded end of the screw 108 extends through and mates with a threaded bore formed in an arm 122 which extends laterally from an elongated pivot section 124 both of which are integral parts of the pivot member 106. As seen in FIG. 6, the upper part of the arm 122 is integrally formed with a forwardly extending and cantilevered portion 126 which serves as a support for a position indicator 128 having a pointer 130 which cooperates with indicia located on the top wall 110 of the base housing 104 for indicating whether or not the lamp unit 14 is in the correct adjusted position in the horizontal plane. As seen in FIGS. 5 and 6, the pivot section 124 is formed with a pair of vertically aligned and outwardly projecting ribs 132 and 134 which extend substantially the full length of the pivot section 124 along the longitudinal axis thereof. The ribs 132 and 134 are located in a pair of opposed complementary guide tracks formed in the base housing so that upon rotation of the screw 108 in one direction or the other, the pivot member 106 slides relative to the base housing 104 along an axis parallel to the longitudinal axis of the screw 108 causing the pivot surface 96 to be moved axially either further outwardly or further inwardly relative to the front wall 116 of the base housing 104.

The position indicator 128 is made of a metallic material and includes a top flat section 136 integrally formed with a pair of downwardly extending and laterally spaced legs 138 and 140. The free ends of the legs 138 and 140 are integrally formed with inwardly projecting tab portions, respectively, which project into a pair of horizontally extending slots 142 and 144 located on the opposed sides of the cantilevered portion 126. Thus, the position indicator 128 in effect, is wrapped around the cantilevered portion 126 and frictionally retained in a fixed position relative thereto and can only be moved along the length of the cantilevered portion 126 by use of a hand tool. In this regard, it will be noted that the top section 136 of the position indicator 128 is provided with an elongated slot 146 one side wall of which is formed with a plurality of teeth. In addition, the cantilevered portion 126 has a bore 148 formed therein adjacent to the teeth that is adapted to receive the work end 150 of a hand tool such as a TORX screw driver. Accordingly, as seen in FIG. 4, when the work end 150 of such hand tool is inserted into the bore 148 and rotated in one direction or the other, the teeth of the work end 150 of the hand tool will mesh with the teeth of the position indicator 128 and cause a repositioning of the pointer 130 along the longitudinal length of the portion and relative to the indicia on the base housing 104.

As seen in FIG. 2, the pointer 130 is located in line with the center marking of the indicia and, accordingly, would indicate to the observer that the lamp unit 14 is in the properly adjusted position in the horizontal plane. It is intended that this properly adjusted position in the horizontal plane would normally be achieved during final inspection of the vehicle in the vehicle manufacturer's assembly plant. In order to do so, a mechanical aimer is used to obtain the initial properly adjusted position of the lamp unit 14 in the horizontal plane. Once the properly adjusted position is achieved, the TORX screwdriver will be inserted into the bore 148, as previously described, and the pointer 130 will be aligned with the "0" center line as seen in FIG. 2. Once the vehicle leaves the assembly plant, if the headlamp unit 14 should be found to be out of proper adjustment due to an inadvertent or deliberate rotation of the screw 108, it will be a simple matter for the vehicle owner to again rotate the screw 108 so as to reposition the pivot member 124 and, accordingly, the pointer 130 so it again is in line with the "0" center line to indicate that the lamp unit 14 is properly positioned in the horizontal plane. In addition, if for some reason, such as after a front end collision, the headlamp assembly 10 must be mechanically re-aimed in a horizontal plane, the movable position indicator 128 will allow re-calibration of the adjustment device 20 as described above.

It should be noted that, as alluded to above, the adjustment device 22 serves to position the headlamp unit in a vertical plane about a horizontal aim axis which passes through the rotational centers provided by the pivot surfaces 94 and 96. However, when the screw 108 of the adjustment device 20 is rotated to cause the pivot member 106 to move as explained above, the lamp unit 14 will actually pivot about an axis which, as seen in FIG. 1, passes through the center of the head 64 of the associated screw and the center of the pivot surface 94 of bracket 18. Thus, although the lamp unit 14, in effect, moves in a horizontal plane when the adjustment device 20 is used, the pivoting of the lamp unit 14 is about an inclined axis. Thus, after adjustable positioning of the lamp unit 14 using the adjustment device 20, it may be necessary to make some adjustment of the headlamp unit using the adjustment device 22 and the level device 70.

Various changes and modifications can be made in the construction of this headlamp assembly without departing from the spirit of the invention. Such changes and modifications are contemplated by the inventors and they do not wish to be limited except by the scope of the appended claims.

The embodiments of the invention in which an exclusive property or privilege is claimed are defined as follows:

1. In combination with a headlamp assembly having a lamp unit supporting a light source and adapted to be adjusted in a vertical plane and in a horizontal plane relative to a support panel for aiming the light beam emitted by said lamp unit, a first adjustment device located between said support panel and a first portion of said lamp unit for adjusting the position of said lamp unit in said vertical plane, a second adjustment device located between said support panel and a second portion of said lamp unit for adjusting said lamp unit in a horizontal plane, said second adjustment device comprising a housing fixed to said support panel and supporting a relatively movable pivot member which provides a pivot point for one end of said headlamp unit, a screw rotatably supported by said housing and threadably connected to said pivot member for moving the latter fore and aft of said housing for adjusting the position of said one end of said lamp unit for aiming purposes, indicia formed on said housing for indicating the adjusted aim position of said lamp unit in said horizontal plane, and a position indicator adjustably carried by said pivot member adjacent to said indicia so that upon establishing the desired aimed position of said lamp unit by rotating said screw, said position indicator is subsequently moved relative to said pivot member in line with a zero ("0") marking of said indicia so as to indicate the adjusted position of said lamp unit in said horizontal plane, said position indicator comprising a slide member provided with a pointer, said slide member having a top section with an elongated slot formed therein, one side wall of said slot having a plurality of teeth adopted to be engaged by a hand tool for moving said slide member relative to said indicia.

2. The combination as set forth in claim 1 wherein said slide member is made from a metallic material and said top section is integrally formed with a pair of laterally spaced legs which straddle a portion of said pivot member.

3. The combination as set forth in claim 1 wherein said teeth formed on said slide member are located adjacent a bore provide in said pivot member for receiving the work end of said hand tool so as to allow the teeth on said work end to mesh with the teeth on said slide member.

* * * * *

UNITED STATES PATENT AND TRADEMARK OFFICE
CERTIFICATE OF CORRECTION

PATENT NO. : 5,063,480

DATED : November 5, 1991

INVENTOR(S) : David R. McMahan, William E. Nagengast, Luis A. Mateos

It is certified that error appears in the above-identified patent and that said Letters Patent is hereby corrected as shown below:

Title page, item [75], the inventor's name "William E. Magengast" should read -- William E. Nagengast --.

Signed and Sealed this

Fourth Day of May, 1993

Attest:

MICHAEL K. KIRK

*Attesting Officer*     *Acting Commissioner of Patents and Trademarks*